(12) United States Patent
Sampsell et al.

(10) Patent No.: US 6,256,714 B1
(45) Date of Patent: *Jul. 3, 2001

(54) COMPUTER SYSTEM WITH EFFICIENT MEMORY USAGE FOR MANAGING MULTIPLE APPLICATION PROGRAMS

(75) Inventors: Jeffrey B. Sampsell, Vancouver; Jon A. Fairhurst, Camas, both of WA (US); Eugene P. Martinez, Jr.; Larry Alan Westerman, both of Portland, OR (US)

(73) Assignee: Sharp Laboratories of America, Inc., Camas, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,932

(22) Filed: Mar. 16, 1999

Related U.S. Application Data

(60) Provisional application No. 60/094,361, filed on Sep. 2, 1998.

(51) Int. Cl.[7] .............................. G06F 12/00; G06F 13/00
(52) U.S. Cl. ........................................... 711/154; 711/159
(58) Field of Search .................................. 711/100, 154, 711/159

(56) References Cited

U.S. PATENT DOCUMENTS

| | | | |
|---|---|---|---|
| 4,291,388 | 9/1981 | Ecker, Jr. et al. | 711/103 |
| 4,459,662 | 7/1984 | Skelton et al. | 711/100 |
| 4,825,356 | 4/1989 | Lenoski | 712/205 |
| 4,905,196 | 2/1990 | Kirrmann | 365/200 |
| 4,907,150 | 3/1990 | Arroyo et al. | 713/323 |
| 5,136,631 | 8/1992 | Einhorn et al. | 379/88.22 |
| 5,386,552 | 1/1995 | Garney | 714/10 |
| 5,408,624 | 4/1995 | Raasch et al. | 717/11 |
| 5,471,624 | 11/1995 | Enoki et al. | 713/1 |
| 5,530,847 | 6/1996 | Schieve et al. | 714/38 |
| 5,530,877 | 6/1996 | Hanaoka | 713/300 |
| 5,574,853 | 11/1996 | Barch et al. | 714/30 |
| 5,575,174 | 11/1996 | Kanematsu et al. | 74/473.23 |
| 5,682,550 | 10/1997 | Brown et al. | 710/10 |
| 5,754,863 | 5/1998 | Reuter | 717/11 |

*Primary Examiner*—David L. Robertson
(74) *Attorney, Agent, or Firm*—Chernoff, Vilhauer McClung & Stenzel

(57) ABSTRACT

A first device includes a processor, a first memory, and a memory manager. A second device includes a second memory and a first application program, and a third device includes a third memory and a second application program. The first application program is loaded into the first memory to be executed by the processor. Application program variables related to the first application are stored in the first memory. The second application program to be executed by the processor is loaded into the memory in at least a partially overlapping manner of the first application program. The creation of second application program variables related to the second application program in the first memory is in a region not occupied by the first application program. Alternatively, the first and second application programs may be in the same device and/or memory.

60 Claims, 1 Drawing Sheet

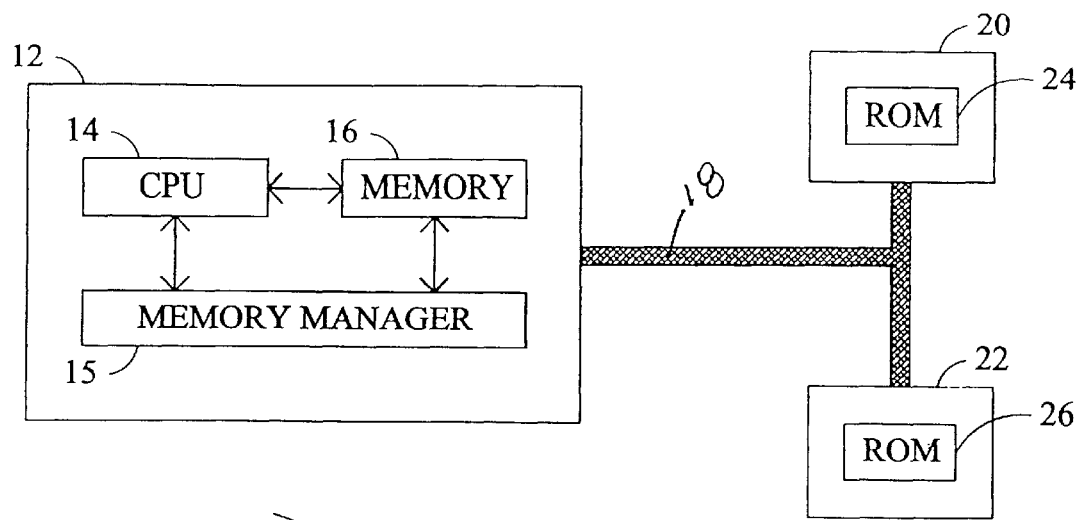
FIG. 1
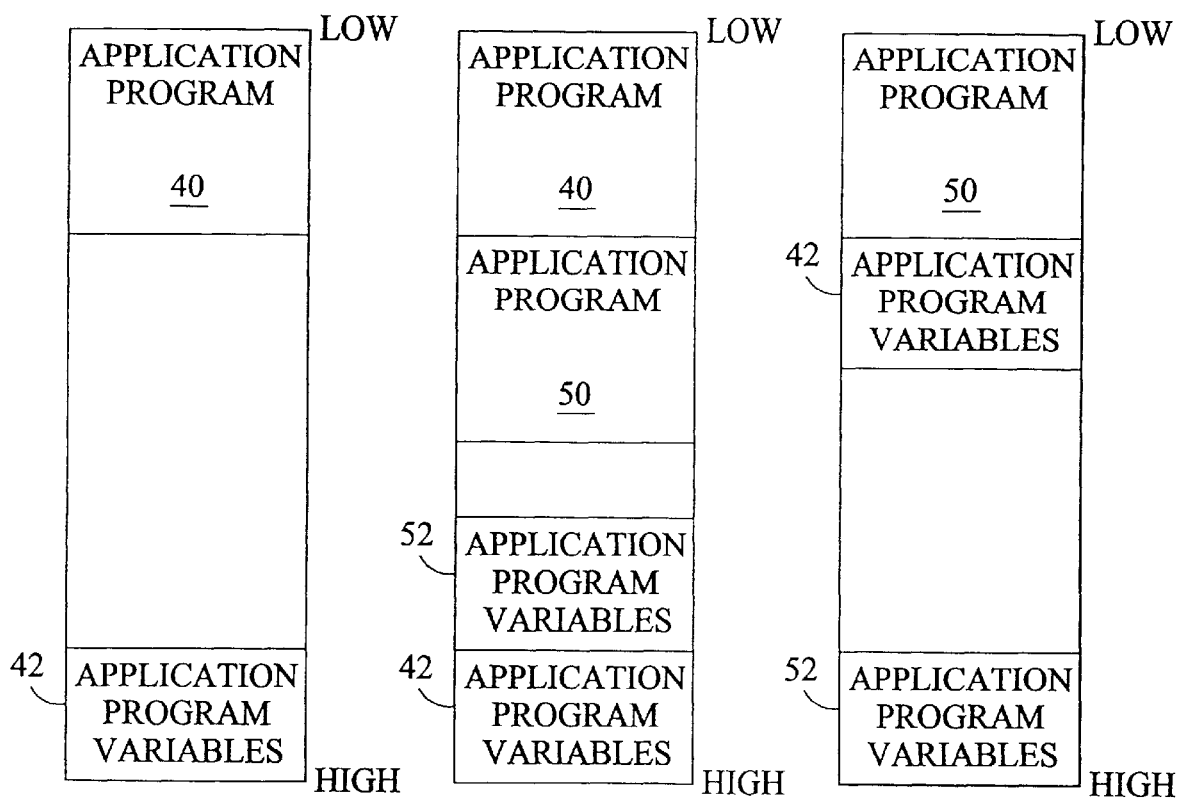
FIG. 2
(PRIOR ART)
FIG. 3
(PRIOR ART)
FIG. 4

COMPUTER SYSTEM WITH EFFICIENT MEMORY USAGE FOR MANAGING MULTIPLE APPLICATION PROGRAMS

This application claims the benefit of 60/094,361 filed Sep. 2, 1998.

BACKGROUND OF THE INVENTION

The present invention relates to a computer system with efficient memory usage for executing a plurality of application programs.

Conventional computers execute application program instructions based on a stored-program model. Application program instructions are stored in memory from which a central processing unit (CPU) sequentially reads and executes. Executing the instructions results in a series of state changes, such as changed variable values. The stored-program model may simultaneously exist at several levels: at the lowest level the CPU is executing microcode; at an intermediate level a low level application program comprising machine-code instructions is being interpreted by the CPU; and at the highest level a high level application program comprising pseudo-operations is interpreted by the low level application program. Visual Basic, C, Fortran, and Java are examples of high level application programs. A Java example may include byte-code data comprising a high-level "aplet" that is read by a Java virtual machine, which is interpreted sequentially into lower-level operating system calls, which in turn results in machine code sequences being executed by the CPU.

In personal computers, such as x-86 and PowerPC based architectures, certain elements of the operating system code may be contained in read-only memory (ROM) or stored on a disk drive from which they are executed. Application programs are generally stored on a disk drive from which they are loaded and executed, as desired. For example, the application program may be Microsoft Word or Photoshop, and the operating system may be Linux or Windows. When the computer lacks sufficient random access memory (RAM) to simultaneously store both the operating system and the application programs, alternative storage may be used to provide "virtual" memory. The alternative storage may be any suitable device, such as a hard drive or a tape drive. Virtual memory overcomes the limitation of a computer with insufficient RAM, but unfortunately is relatively slow. Elaborate systems have been developed to manage the movement of data between RAM and alternative storage in order to optimize both the use of the limited RAM and the overall execution speed. However, the "virtual" memory of the computer is still limited to the combined capacity of the RAM/ROM and alternative storage at added expense.

Application programs in embedded control systems do not generally change between executions, even over periods spanning the lifetime of the embedded control system. In such cases, the application program may be economically stored in ROM. However, such embedded control systems still require a limited amount of RAM capacity to store application program variables which change during the execution of the application program. Many such embedded control systems incorporate mechanisms for storing the application program variables during periods of inactivity or when the power is temporally not supplied to the system. For example, the application program variables may be stored on a disk drive or an electrically-programmable ROM (EPROM). The predetermined size and operating characteristics of the application programs in an embedded control system permits the use of RAM having a capacity merely sufficient to execute the application program, which reduces expense.

Many personal computers and embedded control systems provide the ability to save and restore the operating state of the CPU, application program(s), and application program variables when "simultaneously" executing multiple application programs. When "simultaneously" executing multiple application programs, the sharing of the limited resources of the computer system or embedded control system must be handled in a transparent manner. The different application programs and application program variables may need to be loaded into RAM and removed from RAM in an efficient manner. In addition, periodically external system inputs may require the suspension of the currently executing application program to execute an alternative application program. Many such computer systems and embedded control systems incorporate mechanisms for accommodating the execution of multiple application programs.

Ecker, Jr. et al., U.S. Pat. No. 4,291,388, disclose the use of electrically-alterable ROM to contain the contents of both user control program RAM and an I/O image table that depicts the status of the controller.

Kirrmann, U.S. Pat. No. 4,905,196, discloses the use of an auxiliary memory or memories to save status information at periodic recovery points, thus permitting the main process to be restarted in the event of a fault.

Arroyo et al., U.S. Pat. No. 4,907,150, disclose the use of a special save area to hold system state information upon power down. The special save area of memory is supplied with power even when the main power if off.

Enoki et al., U.S. Pat. No. 5,386,552, disclose the use of a mass storage device to hold the processing state of a system when a triggering event occurs.

Garney, U.S. Pat. No. 5,471,624, discloses the use of a device for judging whether the restoration of saved state information was correct, so that the system may or may not resume operation after an interruption, based upon the integrity of the restoration.

Pearce, U.S. Pat. No. 5,754,853, discloses the storage of system state to disk, permitting the operation of utility programs and reactivation of the original system state.

Skelton et al., U.S. Pat. No. 4,459,662, disclose a system in which the ROM memory has greater capacity than the RAM memory, so that only segments of the ROM program may be read at a time. A mechanism is described for re-utilizing areas of RAM no longer required for instruction execution.

Lenoski, U.S. Pat. No. 4,825,356, discloses the use of an onboard ROM to provide microcode instructions while the RAM is used for other purposes.

Schieve et al., U.S. Pat. No. 5,530,847, disclose loading program instructions from a non-volatile memory into RAM for execution, especially when the program code is stored in compressed form.

Kanematsu et al., U.S. Pat. No. 5,575,174, disclose the use of multiple suspend files to save multiple system states, with a cross-session data file monitor.

Einhorn et al., U.S. Pat. No. 5,136,631, disclose the transfer of code, under the control of a first system, into the memory of a second system , from which the code is executed to provide telephone control.

Raasch et al., U.S. Pat. No. 5,408,624, disclose the transfer of code from a main CPU to a peripheral controller, from which the code can be executed.

Reuter, U.S. Pat. No. 5,754,863, discloses the transfer of code from a master microprocessor to a slave microprocessor for execution in RAM, where the slave microprocessor does not require any instruction codes in ROM.

Brown et al., U.S. Pat. No. 5,682,550, disclose the creation of a non-volatile storage containing the states of several independent software entities.

SUMMARY OF THE INVENTION

The present invention overcomes the aforementioned drawbacks of the prior art by preferably providing a first device including a processor, a first memory, and a memory manager. A second device includes a secondary memory and a first application program, and a third device includes a third memory and a second application program. The first application program is loaded into the first memory to be executed by the processor. Application program variables related to the first application are stored in the first memory. The second application program to be executed by the processor is loaded into the memory in at least a partially overlapping manner of the first application program. The creation of second application program variables related to the second application program in the first memory is in a region not occupied by the first application program. In an alternative preferred embodiment, the first and second application programs may be stored in the same device and/or memory.

The foregoing and other objectives, feature and advantages of the present invention will be more readily understood upon consideration of the following detailed description of the invention taken in conjunction with the accompanying drawings.

BRIEF DESCRIPTION OF THE DRAWINGS

FIG. 1 is a block diagram of an exemplary embodiment of a distributed system of the present invention including a controller device including memory.

FIG. 2 is an illustration of the memory of the controller device including an application program and application program variables.

FIG. 3 is an illustration of the memory of FIG. 2 with two application loaded using the traditional technique.

FIG. 4 is an exemplary embodiment of the illustration of the memory of FIG. 2 with two applications loaded using the technique of the present invention.

DETAILED DESCRIPTION OF THE PREFERRED EMBODIMENT

The present inventors came to the realization that most computer networks are based on the premise of a powerful server with significant storage capacity used in combination with clients potentially having less storage capacity. Normally such a server includes sufficient RAM in combination with a hard drive for added storage capacity to accommodate the anticipated needs for simultaneously executing multiple large application programs. Many memory management systems have been designed to efficiently handle systems including powerful servers.

Embedded electronic controllers are being included within many devices which historically had not included embedded controllers. For example such devices may include, toasters, telephones, watches, vehicles, microwaves, alarm clocks, stoves, ovens, washers, dryers, stereos, televisions, and video cassette recorders. Normally the embedded controllers include sufficient ROM to store an application program and limited RAM for storing the state of application program variables. Some devices may include the ability to be connected to a command/data bus to provide external control. The present inventors came to the realization that an inexpensive controller, with limited memory, would be greatly beneficial to control a plurality of such devices. To minimize the controller's expense an intelligent memory management system is desirable to reduce the size of the RAM. In the event that the limited memory capacity of the controller is exceeded several events may occur, such as the controller crashing, the controller refusing to load additional application programs, or the controller removing entire application programs and associated variables requiring the application program to be loaded and reinitialized when executed again. The present inventors came to the realization that these options are not acceptable for a robust, yet inexpensive, controller system including limited memory capability. The preferred memory management system should minimize the likelihood of exceeding the memory capacity of the controller device while allowing robust execution of multiple application programs.

Referring to FIG. 1, a distributed system 10 includes a controller device 12 which contains a central processing unit (CPU) 14 which executes application programs stored in a memory 16. A memory manager 15 tracks the regions in the memory 16 of different application programs and associated application program variables. The memory manager 15 also preferably determines the locations to load and relocate application programs and application program variables in the memory 16. The memory 16 preferably offers fast read write access, such as RAM. The controller device 12 is also capable of receiving data from and providing data to a system bus 18. Peripheral devices 20 and 22 are interconnected to the system bus 18. The peripheral devices 20 and 22 are preferably of the same general type of device described above, such as toasters and VCRs. It is to be understood that any number and type of peripheral device may be used in the system 10. Each of the peripheral devices 20 and 22 include an application program preferably stored in non-volatile memory 24 and 26, such as ROM. In most instances neither the controller device 12 or the peripheral devices 20 and 22 have additional storage capability, such as a hard drive. Typically, even if the peripheral devices 20 and 22 included a hard drive the controller device would not have access to it. The peripheral devices 20 and 22 and controller device 12 normally include ROM, and sometimes RAM. The controller device 12 is suitable for use with home audio/video interoperability or Havi-compliant devices.

The controller device 12 loads the desired application program from the respective peripheral device which is then preferably executed by an interpreter. For example, the controller device 12 may load the application program stored in ROM 24 of peripheral 20 and store a copy of the application program in the memory 16 of the controller device 12. The application program is typically executed by an interpreter which results in a series of initialization operations to occur. Alternatively, the application program may be native byte code which would require no interpretation. The result of the execution may include the presentation of information to the user. In response to user selections or the execution of the application program, data and commands may be provided to and received from the bus 18 for any suitable peripheral device. The state of an application program includes an associated set of application program variables and any other particular information related to the application program, such as registry entries within the CPU 14. During execution of the application program the state information of the application program (application program variables and other data necessary to restore the application to its current state) is contained in the memory 16.

If the controller device 12 accesses another peripheral device, such as peripheral 22, the corresponding application program is loaded from the ROM 26 of peripheral device 22 into the memory 16 of the controller device 12. An initialization operation occurs with respect to the application program from ROM 26.

Alternatively, one peripheral device may contain multiple application programs that are provided to the controller device. The multiple applications may be stored in one or more memories.

Referring to FIG. 2, the preferred technique of loading an application program 40 is to store it in a low-address portion of memory 16. The variables 42 required by the application program 40 are stored in a high-address portion of the memory 16, with the size of the memory used for the variables increasing toward lower addresses to minimize the potential conflict of the application program 40 with the variables 42.

Referring to FIG. 3, an additional application program 50 is normally loaded adjacent to the existing application program 40 in memory 16 so that the existing application program 40 remains unchanged for future use. Unfortunately, there may be insufficient space to store multiple application programs in the memory. If the memory capacity of the memory 16 is exceeded then several undesirable events may occur, as previously described. However, it is desired to minimize the size of the memory 16 while reducing the likelihood of memory conflicts.

The present inventors came to the realization that the model shown in FIG. 3 for memory usage is not optimal for an inexpensive controller device 12 with limited memory and potentially no additional storage, such as a hard drive. In addition, the present inventors came to the realization that normally the application program requires significantly larger amounts of memory than its corresponding application program variables. Accordingly, the present inventors came to the realization that by overwriting the existing application program in memory with the new application program, together with saving or otherwise maintaining the existing variables, the memory requirements of the controller device 12 may be significantly reduced. Referring to FIG. 4, the new application program is loaded in the low-address portion of the memory in at least a partially overlapping manner with the existing application program. The existing variables 42 are preferably relocated to a position adjacent the new application program 50. When the new application program 50 is initialized, a new variable block 52 is created at the high-address end of memory, which increases toward the lower addresses. In this manner, the existing state of the first application program 40 is retained while permitting a maximum single region for the new application program 50.

To restore the state of the controller device 12 prior to the initialization of the new application program 50, the previous application program 40 is reloaded and the associated application program variables 42 are restored to the high-address portion of the memory. The controller device 12 then resumes the execution of the previous application program 40. In this manner, an application program may be interrupted, overwritten in memory by another application program, and later restored, without the loss of the state of the application program. In addition, the memory requirements for the controller device 12 are reduced, thus reducing the expense of the controller device 12.

The configuration of FIG. 4 is shown with two application programs for convenience of illustration. It is to be understood that the technique may be generalized to the case in which N devices are active, and the N+1 device is loaded. In this case, the N device variable data blocks must be relocated in memory to accommodate the new device application program, while maximizing the amount of available space fort the new device variable data block. It is preferable that the application program is stored at the lowest block of memory addresses with the stored application program variables adjacent thereto and the current application program variables increasing in size from high to low memory. This configuration provides a convenient technique for permitting a large contiguous memory block for the current application program variables. However, any other suitable memory configuration is also within the scope of the invention. The important aspect of the memory usage is that the essential state information for each application program is maintained while a different application program is being executed. Application programs are preferably loaded into memory in at least a partially overlapping fashion with the existing application program. With embedded control systems the application programs are generally non-mutating and do not change over time so reloading the application program each time its application instructions are to be executed is an effective way of reducing the memory requirements of the controller device.

If the current application program results in the use of sufficient memory that the saved application program variables are overwritten, then the respective application programs can not be reloaded together with restoring the proper state information. The respective application program of a overwritten variable block, if reloaded, would need to be reinitialized. Appropriate messages regarding the loss of data should be communicated to the user.

The memory manager 15 preferably maintains a data table which identifies the location and size of all application program variables. When the size of the current application program variables is increased, the table of the memory manager 15 is checked to determine whether the memory utilization has invalidated the contents of stored application program variables for different application programs. If the current application program variables overwrites stored application program variables then the table is flagged to indicate this occurrence. Such a corruption of other application program variables prevents the associated application program from resuming properly and therefore requires reinitialization of the application program when the device is next accessed. When an application program is loaded, the table may be searched to determine if the device was previously active, and if so, the contents of memory can be rearranged to restore the state of the respective application program. In addition, the search of the table may indicate that the application program variables are corrupted and require the reinitialization of the application program. The memory validation may be performed by a dedicated hardware device or by a separate software module incorporated into the interpreter program or operating system.

When N devices are active and the N+1th device is about to encroach on the memory space of the one or more other the other N variable blocks, any suitable technique may be utilized to determine which memory, if any, to sacrifice. Such techniques may include for example, oldest overwritten first, smallest overwritten first, user specified, do not encroach, and terminate application program N+1. The selected technique may require rearrangement of the application program variables within the memory 16, which would be reflected in changes to the data table.

For easiest implementation of the system it is preferable that the application programs not be selfmodifying, so that the contents of the application program do not change between subsequent loading and executions. In the event that the application code changes, sufficient data should be stored along with the application program variables so that the application program can be restored back to its previous state.

It is preferred that the first application program is "suspended" prior to loading and executing the second application program. Thereafter, the first application program may "resume" operation. In addition, during "suspension" of a program the memory manager may compress the stored data and discard unnecessary variables and data.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A computer system comprising:
    (a) a first device including a processor, a first memory, and a memory manager;
    (b) a second device including a second memory, said second memory including a first application program;
    (c) a third device including a third memory, said third memory including a second application program;
    (d) said first device connected to said second device so that the entire said first application program may be loaded into said first memory prior to being executed by said processor, said first device connected to said third device so that the entire said second application program may be loaded into said first memory prior to being executed by said processor;
    (e) said memory manager causes said first application program to be at least partially overwritten by said second application program when said entire first application program is presently loaded in said first memory and said entire second application program is being loaded into said first memory; and
    (f) said memory manager defining the region occupied by first application program variables for said first program not for initial use by second application program variables for said second program when said first application program is said presently loaded in said first memory and said second application program is said being loaded into said first memory.

2. The computer system of claim 1 further comprising:
    (a) said memory manager causes said second application program to be at least partially overwritten by said first application program when said second application program is presently loaded in said first memory and said first application program is being reloaded into said first memory; and
    (b) said memory manager making available said first application program variables to said first program so that said first program resumes execution by said processor at the point terminated prior to loading said second application program.

3. The computer system of claim 2 further comprising said computer system loading said second program in a first contiguous block of memory.

4. The computer system of claim 3 further comprising said computer system relocating said first application program variables in a second contiguous block of memory adjacent said first contiguous block of memory.

5. The computer system of claim 4 wherein said first contiguous block of memory starts at a low memory address of said first memory.

6. The computer system of claim 5 wherein said second contiguous block of memory starts at a higher memory address than said first contiguous block of memory.

7. The computer system of claim 6 wherein said second application program variables start at a higher memory address than said relocated first application program variables.

8. The computer system of claim 7 wherein said second application program variables start at the same memory address that said first application program variables started prior to said relocating said first application program variables.

9. The computer system of claim 1 wherein said first memory is a volatile memory, said second memory is a non-volatile memory, and said third memory is a nonvolatile memory.

10. The computer system of claim 1 wherein said first memory is RAM, said second memory is ROM, and said third memory is ROM.

11. The computer system of claim 1 wherein said first application program and said second application program are non-self modifying programs.

12. The computer system of claim 1 wherein said first device is remotely located from said second and third devices.

13. The computer system of claim 1 wherein said first device does not include a hard drive.

14. The computer system of claim 1 wherein at least one of said second device and said third device does not include a hard drive.

15. The computer system of claim 1 wherein said first device only includes storage in the form of memory.

16. A method of managing memory for a computer system comprising:
    (a) providing a first device including a processor, a first memory, and a memory manager;
    (b) providing a second device including a second memory, said second memory including a first application program;
    (c) providing a third device including a third memory, said third memory including a second application program;
    (d) loading the entire said first application program into said first memory prior to being executed by said processor;
    (e) storing application program variables related to said first application program in said first memory;
    (f) loading the entire said second application program prior to being executed by said processor into said first memory in at least a partially overlapping manner of said first application program; and
    (g) initially creating second application program variables related to said second application program in said first memory in a region not occupied by said first application program.

17. The method of claim 16 further comprising:
    (a) loading said first application program to be executed by said processor into said first memory in at least a partially overlapping manner of said second application program; and
    (b) restoring said first application program variables to said first program so that said first application program resumes execution by said processor at the point terminated prior to loading said second application program.

18. The method of claim 17 further comprising loading said second program in a first contiguous block of memory.

19. The method of claim 18 further comprising relocating said first application program variables in a second contiguous block of memory adjacent said first contiguous block of memory.

20. The method of claim 19 wherein said first contiguous block of memory starts at a low memory address of said first memory.

21. The method of claim 20 wherein said second contiguous block of memory starts at a higher memory address than said first contiguous block of memory.

22. The method of claim 21 wherein said second application program variables start at a higher memory address than said relocated first application program variables.

23. The method of claim 22 wherein said second application program variables start at the same memory address that said first application program variables started prior to said relocating said first application program variables.

24. The method of claim 16 wherein said first memory is a volatile memory, said second memory is a non-volatile memory, and said third memory is a non-volatile memory.

25. The method of claim 16 wherein said first memory is RAM, said second memory is ROM, and said third memory is ROM.

26. The method of claim 16 wherein said first application program and said second application program are non-self modifying application programs.

27. The method of claim 16 wherein said first device is remotely located from said second and third devices.

28. The method of claim 16 wherein said first device does not include a hard drive.

29. The method of claim 16 wherein at least one of said second device and said third device does not include a hard drive.

30. The method of claim 16 wherein said first device only includes storage in the form of memory.

31. A computer system comprising:
   (a) a first device including a processor, a first memory, and a memory manager;
   (b) a second device including a second memory, said second memory including a first application program, said second memory including a second application program;
   (c) said first device connected to said second device so that the entire said first application program and the entire said second application program may be loaded into said first memory and executed by said processor;
   (d) said memory manager causes said first application program to be at least partially overwritten by said second application program when said first application program is presently loaded in said first memory and said second application program is being loaded into said first memory; and
   (e) said memory manager defining the region occupied by first application program variables for said first program not for initial use by second application program variables for said second program when said first application program is said presently loaded in said first memory and said second application program is said being loaded into said first memory.

32. The computer system of claim 31 further comprising:
   (a) said memory manager causes said second application program to be at least partially overwritten by said first application program when said second application program is presently loaded in said first memory and said first application program is being reloaded into said first memory; and
   (b) said memory manager making available said first application program variables to said first program so that said first program resumes execution by said processor at the point terminated prior to loading said second application program.

33. The computer system of claim 32 further comprising said computer system loading said second program in a first contiguous block of memory.

34. The computer system of claim 33 further comprising said computer system relocating said first application program variables in a second contiguous block of memory adjacent said first contiguous block of memory.

35. The computer system of claim 34 wherein said first contiguous block of memory starts at a low memory address of said first memory.

36. The computer system of claim 35 wherein said second contiguous block of memory starts at a higher memory address than said first contiguous block of memory.

37. The computer system of claim 36 wherein said second application program variables start at a higher memory address than said relocated first application program variables.

38. The computer system of claim 37 wherein said second application program variables start at the same memory address that said first application program variables started prior to said relocating said first application program variables.

39. The computer system of claim 31 wherein said first memory is a volatile memory, and said second memory is a non-volatile memory.

40. The computer system of claim 31 wherein said first memory is RAM, and said second memory is ROM.

41. The computer system of claim 31 wherein said first application program and said second application program are non-self modifying programs.

42. The computer system of claim 31 wherein said first device is remotely located from said second device.

43. The computer system of claim 31 wherein said first device does not include a hard drive.

44. The computer system of claim 31 wherein said second device does not include a hard drive.

45. The computer system of claim 31 wherein said first device only includes storage in the form of memory.

46. A method of managing memory for a computer system comprising:
   (a) providing a first device including a processor, a first memory, and a memory manager;
   (b) providing a second device including a second memory, said second memory including a first application program and a second application program;
   (c) loading the entire said first application program into said first memory prior to being executed by said processor;
   (d) storing application program variables related to said first application program in said first memory;
   (e) loading the entire said second application program prior to being executed by said processor into said first memory in at least a partially overlapping manner of said first application program; and
   (f) initially creating second application program variables related to said second application program in said first memory in a region not occupied by said first application program.

47. The method of claim 46 further comprising:
(a) loading said first application program to be executed by said processor into said first memory in at least a partially overlapping manner of said second application program; and
(b) restoring said first application program variables to said first program so that said first application program resumes execution by said processor at the point terminated prior to loading said second application program.

48. The method of claim 47 further comprising loading said second program in a first contiguous block of memory.

49. The method of claim 48 further comprising relocating said first application program variables in a second contiguous block of memory adjacent said first contiguous block of memory.

50. The method of claim 49 wherein said first contiguous block of memory starts at a low memory address of said first memory.

51. The method of claim 50 wherein said second contiguous block of memory starts at a higher memory address than said first contiguous block of memory.

52. The method of claim 51 wherein said second application program variables start at a higher memory address than said relocated first application program variables.

53. The method of claim 52 wherein said second application program variables start at the same memory address that said first application program variables started prior to said relocating said first application program variables.

54. The method of claim 46 wherein said first memory is a volatile memory and said second memory is a non-volatile memory.

55. The method of claim 46 wherein said first memory is RAM and said second memory is ROM.

56. The method of claim 46 wherein said first application program and said second application program are non-self modifying application programs.

57. The method of claim 46 wherein said first device is remotely located from said second device.

58. The method of claim 46 wherein said first device does not include a hard drive.

59. The method of claim 46 wherein said second device does not include a hard drive.

60. The method of claim 46 wherein said first device only includes storage in the form of memory.

* * * * *

UNITED STATES PATENT AND TRADEMARK OFFICE
CERTIFICATE OF CORRECTION

PATENT NO. : 6,256,714 B1 Page 1 of 1
APPLICATION NO. : 09/270932
DATED : July 3, 2001
INVENTOR(S) : Jeffrey B. Sampsell et al.

It is certified that error appears in the above-identified patent and that said Letters Patent is hereby corrected as shown below:

Column 3, line 29
Change "feature" to --features--

Column 6, line 8
Change "fort" to --for--

Signed and Sealed this

Fifth Day of December, 2006

JON W. DUDAS
*Director of the United States Patent and Trademark Office*